US012011926B2

(12) United States Patent
Yamamoto et al.

(10) Patent No.: US 12,011,926 B2

(45) Date of Patent: Jun. 18, 2024

(54) LIQUID DISCHARGING HEAD AND PRINTING APPARATUS

(71) Applicant: BROTHER KOGYO KABUSHIKI KAISHA, Nagoya (JP)

(72) Inventors: Jiro Yamamoto, Nagoya (JP); Yoshitsugu Morita, Nagoya (JP); Yasuhiro Sekiguchi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 114 days.

(21) Appl. No.: 17/724,596

(22) Filed: Apr. 20, 2022

(65) Prior Publication Data

US 2022/0348012 A1 Nov. 3, 2022

(30) Foreign Application Priority Data

Apr. 28, 2021 (JP) ................................ 2021-076394

(51) Int. Cl.
*B41J 2/14* (2006.01)

(52) U.S. Cl.
CPC .................................. *B41J 2/1433* (2013.01)

(58) Field of Classification Search
CPC .................. B41J 2/14145; B41J 2/1433; B41J 2002/14419
See application file for complete search history.

(56) References Cited

U.S. PATENT DOCUMENTS

2004/0001125 A1* 1/2004 Ito ........................ B41J 2/14209 347/71
2013/0082117 A1* 4/2013 Ito ............................ B41J 2/155 239/66
2017/0173962 A1 6/2017 Mizumo et al.

FOREIGN PATENT DOCUMENTS

JP 2012-179742 A 9/2012
JP 2017-113949 A 6/2017

* cited by examiner

*Primary Examiner* — Jason S Uhlenhake
(74) *Attorney, Agent, or Firm* — Merchant & Gould P.C.

(57) ABSTRACT

There is provided liquid discharging head including common liquid chambers each extends along first direction and arranged in second direction orthogonal to the first direction; and individual channels each communicates with one of the common liquid chambers and each has nozzle. The liquid discharging head has first and second ends in the second direction. The common liquid chambers include intermediate common liquid chamber interposed between two of the common liquid chambers and expanded common liquid chamber closest to the first end, length of the expanded common chamber in the second direction being longer than length of the intermediate common chamber in the second direction. The nozzles of the individual channels communicating with the expanded common chamber are positioned on a side of the second end with respect to the expanded common chamber without being positioned on a side of the first end with respect to the expanded common chamber.

10 Claims, 5 Drawing Sheets

LIQUID DISCHARGING HEAD AND PRINTING APPARATUS

CROSS REFERENCE TO RELATED APPLICATIONS

The present application claims priority from Japanese Patent Application No. 2021-076394, filed on Apr. 28, 2021, the disclosure of which is incorporated herein by reference in its entirety.

BACKGROUND

The present disclosure relates to a liquid discharging head configured to discharge or eject a liquid from a nozzle.

As an example of a liquid discharging head, there is a known ink-jet head which discharges an ink from a nozzle. Such an ink-jet head is provided with a plurality of manifold channels (common liquid chambers) each of which extends in a paper feeding direction and which are arranged side by side in a scanning direction orthogonal to the paper feeding direction, and a plurality of individual liquid channels (individual channels) each having a nozzle which discharges an ink and each communicates with one of the plurality of manifold channels. The nozzles of the individual liquid channels communicating with the respective manifold channels are positioned on the both sides in the scanning direction with respect to each of the manifold channels, and form nozzle rows along the paper feeding direction.

SUMMARY

According to an aspect of the present disclosure, there is provided a liquid discharging head including a plurality of common liquid chambers and a plurality of individual channels.

Each of the plurality of common liquid chambers extends along a first direction and the plurality of common liquid chambers is arranged in a second direction orthogonal to the first direction.

Each of a plurality of individual channels communicates with one of the plurality of common liquid chambers and has a nozzle located at a position where the nozzle does not overlap with corresponding one of the plurality of common liquid chambers in a third direction, the third direction being orthogonal to both of the first direction and the second direction.

The liquid discharging head has a first end in the second direction and a second end in the second direction opposite to the first end.

The plurality of common liquid chambers includes an intermediate common liquid chamber and an expanded common liquid chamber, the intermediate common liquid chamber being one of the plurality of common liquid chambers interposed between two of the plurality of common liquid chambers in the second direction, the expanded common liquid chamber being one of the plurality of common liquid chamber closest to the first end among the plurality of common liquid chambers, a length of the expanded common chamber in the second direction being longer than a length of the intermediate common chamber in the second direction.

The nozzles of the plurality of individual channels communicating with the intermediate common chamber are positioned on both sides in the second direction with respect to the intermediate common chamber.

The nozzles of the plurality of individual channels communicating with the expanded common chamber are positioned in the second direction on a side of the second end with respect to the expanded common chamber without being positioned in the second direction on a side of the first end with respect to the expanded common chamber.

DETAILED DESCRIPTION

Figure 1:
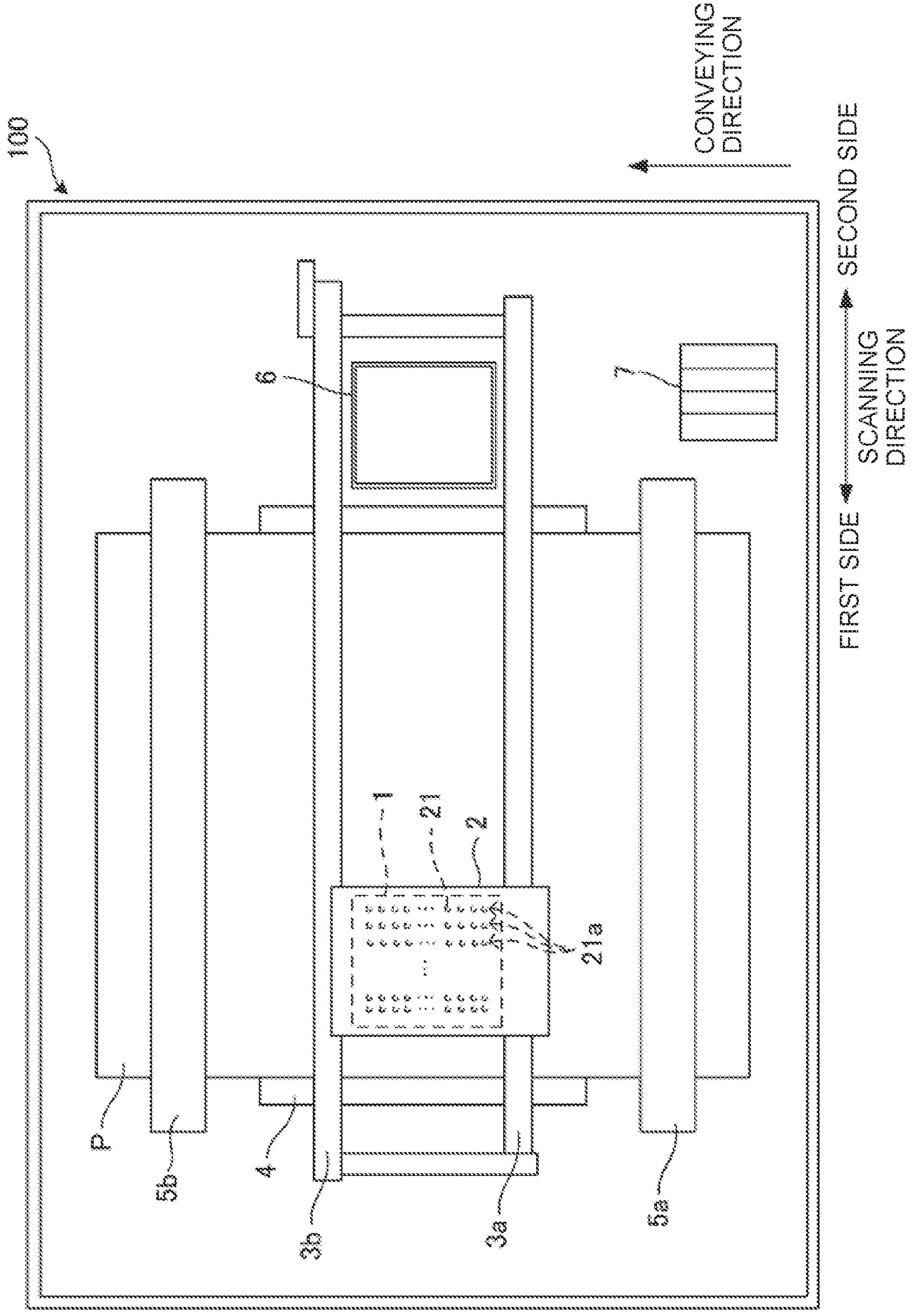
FIG. 1 is a plane view of a printer including an ink-jet head.

The volume of each of the common liquid chambers contributes to a maximum discharging flow amount of the liquid in the liquid discharging head. Accordingly, it is preferred to make the volume of each of the common liquid chambers to be great in order to make a discharging flow amount to be great. In view of this, it is considered to make the width of each of the common liquid chambers (the length, of each of the common liquid chambers, along an arranging direction in which the common liquid chambers are arranged) to be great so as to make the volume of each of the common liquid chambers to be great.

In a case that the width of each of the common liquid chambers is made to be great, however, a spacing distance between the nozzle rows becomes great. In a case that the spacing distance between the nozzle rows is great, a moving distance of the nozzle rows, in an adjustment of the inclination of the head, with respect to a rotation amount of the head is great, which in turn leads to such a problem that the degree of difficulty in the adjustment is increased. Further, in the case that the spacing distance between the nozzle rows is great, the size of a maintenance member such as a cap configured to cover the nozzles in a case of performing suction purge is increased, which in turn leads to any increase in the size of an apparatus provided with the liquid discharging head.

An object of the present disclosure is to provide a liquid discharging head and a printing apparatus capable of suppressing any increase in the degree of difficulty in the adjustment of inclination while making the volume of the common liquid chamber to be great, and capable of suppressing the increase in size of an apparatus provided with the liquid discharging head.

According to the liquid discharging head of the present disclosure, the nozzles are arranged on the second side in the second direction with respect to the expanded common liquid chamber located at the end on the first side in the second direction, and the nozzle is not arranged on the first side in the second direction with respect to the expanded common liquid chamber. Namely, with respect to the expanded common liquid chamber, the nozzle row is not present on the both sides (first and second sides) in the second direction, and the nozzle row is present only on the second side in the second direction with respect to the expanded common liquid chamber. Namely, even in a case that the length along the second direction of the expanded common liquid chamber is great, there is not any situation that the spacing distance between the nozzle rows communicating with the expanded common liquid chamber becomes to be great. Accordingly, it is possible to suppress any increase in the degree of difficulty in the adjustment of inclination while making the volume of the common liquid chamber to be great. Further, it is possible to suppress the increase in the size of the maintenance member, and to suppress the increase in size of an apparatus provided with the liquid discharging head.

In the following, an embodiment of the present disclosure will be explained, with reference to FIG. 1.

<Overall Configuration of Printer>

As depicted in FIG. 1, a printer 100 according to the present embodiment is provided with an ink-jet head 1 (an example of "liquid discharging head" of the present invention), a carriage 2, guide rails 3*a* and 3*b*, a platen 4, conveying rollers 5*a* and 5*b*, a cap 6 and an ink tank 7.

The carriage 2 is supported by the two guide rails 3*a*, 3*b* extending in a scanning direction (left-right direction in FIG. 1) which is along the horizontal direction, and moves in the scanning direction along the guide rails 3*a*, 3*b*. The ink-jet head 1 is mounted on the carriage 2, and moves in the scanning direction together with the carriage 2. In the following explanation, the left side in the scanning direction of FIG. 1 is defined as a "first side" and the right side in the scanning direction in FIG. 1 is defined as a "second side".

Four color inks which are black, yellow, cyan and magenta inks are supplied to the ink-jet head 1 from the ink tank 7 via non-illustrated tubes. The ink-jet head 1 discharges or ejects the ink(s) from a plurality of nozzles 21 formed in a nozzle surface 11*y* (see FIG. 4) which is the lower surface of the ink-jet head 1.

The plurality of nozzles 21 form a nozzle row 21*a* along a conveying direction (a direction from the lower side toward the upper side in FIG. 1; an example of a "first direction" of the present invention) which is orthogonal to the scanning direction in a plane view. The ink-jet head 1 has 24 pieces of the nozzle row 21*a* which are arranged side by side in the scanning direction (an example of a "second direction" of the present invention). Note that the ink-jet head 1 will be explained in detail later on.

The platen 4 is arranged so as to face or be opposite to the nozzle surface 11*y* (see FIGS. 4 and 5) which is the lower surface of the ink-jet head 1, and extends in the scanning direction over the entire length of a recording sheet (recording paper, recording paper sheet) P. The platen 4 supports the recording sheet P from therebelow. The conveying rollers 5*a* and 5*b* are arranged, respectively, on the upstream side and the downstream side in the conveying direction with respect to the carriage 2, and convey the recording sheet P in the conveying direction.

In the printer 100, a conveying processing of conveying the recording sheet P in the conveying direction by the conveying rollers 5*a* and 5*b* by a predetermined distance and a scanning processing of causing the ink(s) to be discharged from the plurality of nozzles 21 of the ink-jet head 1 while moving the carriage 2 in the scanning direction are alternately performed to thereby perform printing on the recording sheet P. Namely, the printer 100 is of the serial system. Note that in the following explanation, a direction orthogonal to both of the scanning direction and the conveying direction (an example of a "third direction" of the present invention) is defined as the up-down direction.

The cap 6 is arranged on the second side in the scanning direction with respect to the platen 4, and is configured to be movable upward and downward by a non-illustrated lifting mechanism. A non-illustrated suction pump is connected to the cap 6. The ink-jet head 1 mounted on the carriage 2 is movable up to a maintenance position at which the ink-jet head 1 faces the cap 6. In a state that the ink-jet head 1 is at the maintenance position, the cap 6 is moved upward or lifted up to a position at which the cap 6 makes contact with the nozzle surface 11*y*, thereby allowing the cap 6 to cover the plurality of nozzles 21 formed in the nozzle surface 11*y*. In a case that the suction pump connected to the cap 6 is driven in a state that the cap 6 covers the plurality of nozzles 21, it is possible to perform a so-called suction purge by which the ink(s) inside the ink-jet head 1 is (are) exhausted from the plurality of nozzles 21. The ink(s) exhausted by the suction purge is (are) stored in a non-illustrated waste liquid tank.

<Ink-Jet Head 1>

Figure 2:
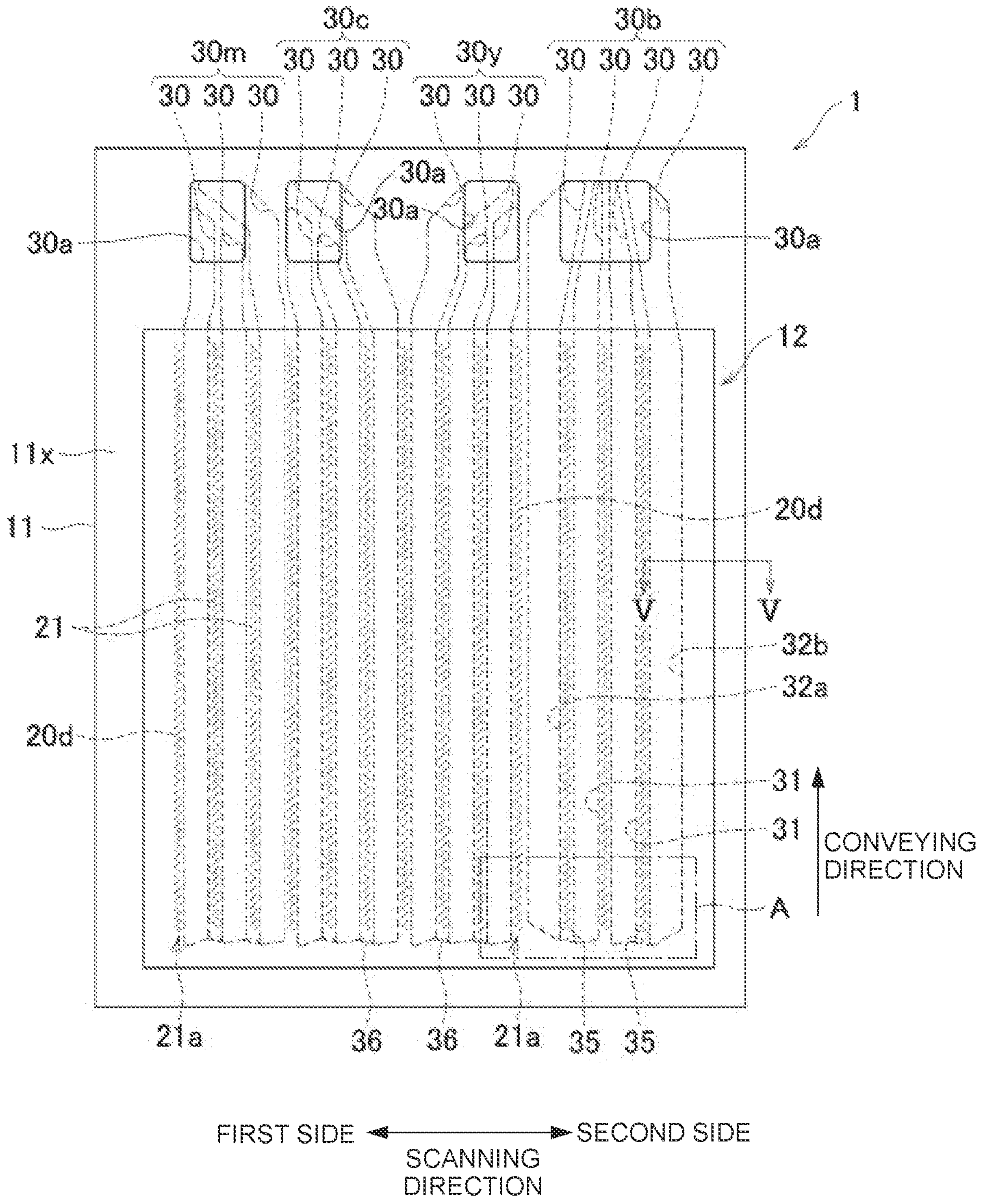
FIG. 2 is a plane view of the ink-jet head depicted in FIG. 1.

Next, the specific configuration of the ink-jet head 1 will be explained, with reference to FIGS. 2 to 5. As depicted in FIG. 2, the ink-jet head 1 has a rectangular shape which is long in the conveying direction in a top view. The ink-jet head 1 is provided with a channel unit 11, a piezoelectric actuator 12, etc.

Figure 4:
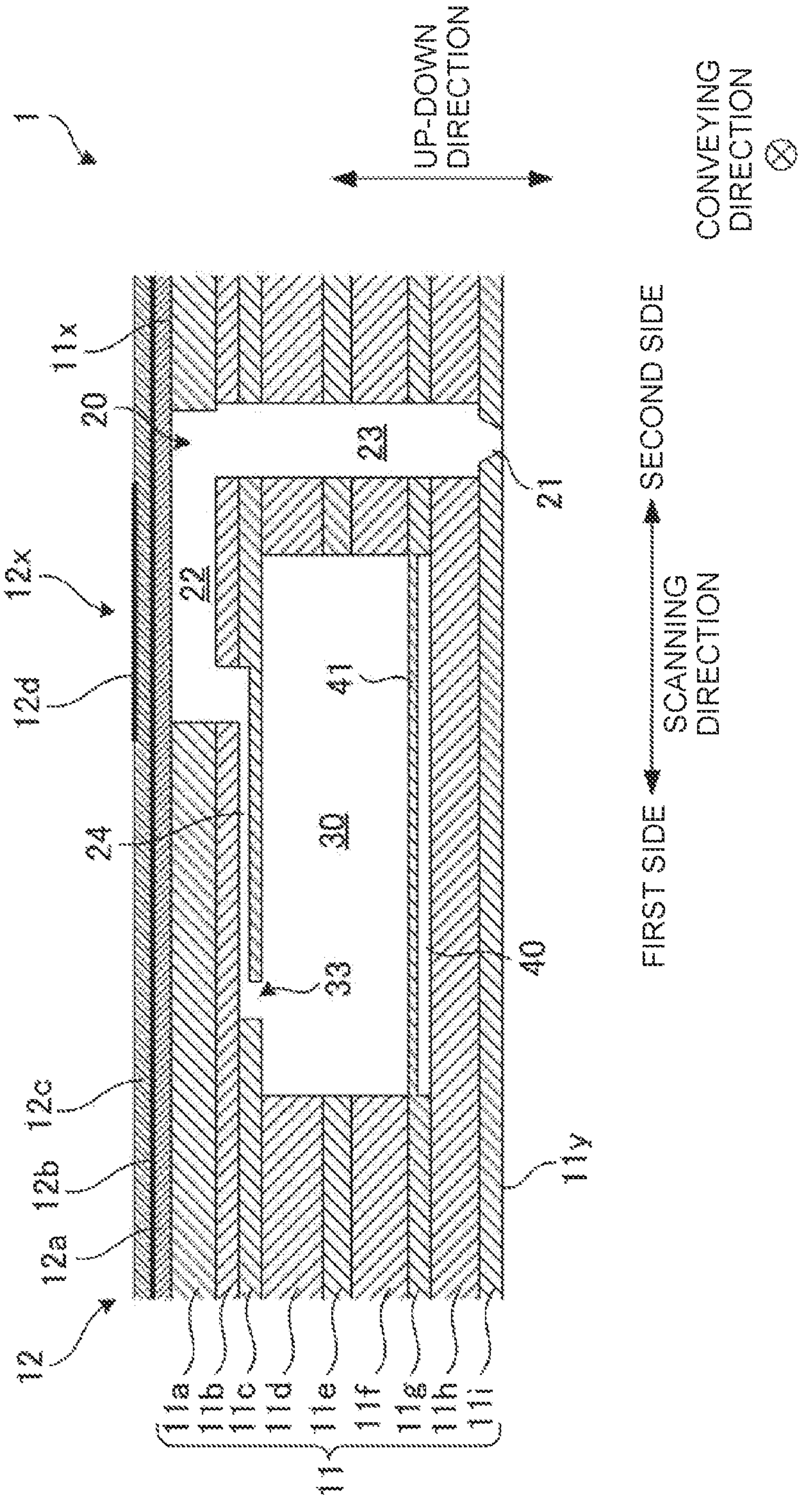
FIG. 4 is a cross-sectional view of the ink-jet head along a IV-IV line in FIG. 3.
Figure 5:
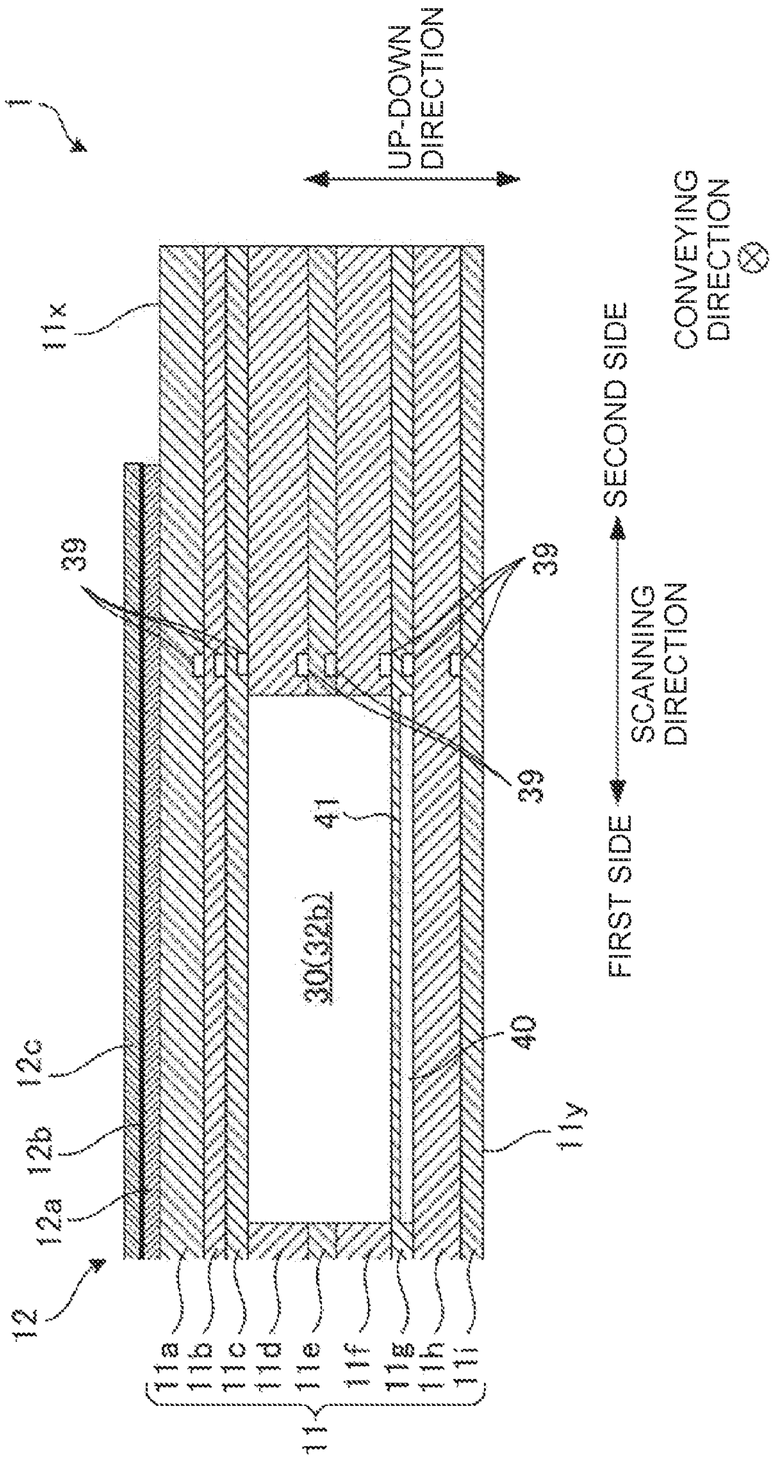
FIG. 5 is a cross-sectional view of the ink-jet head along a V-V line in FIG. 2.

As depicted in FIGS. 4 and 5, the channel unit 11 is constructed of 9 nine pieces of plates 11*a* to 11*i* which are stacked in the up-down direction. The nine plates 11*a* to 11*i* are adhered to one another by an adhesive. A plurality of individual channels 20 (see FIG. 4) each of which has one of nozzles 21 configured to discharge an ink therefrom, and a plurality of manifolds 30 (each of which is an example of a "common liquid chamber" of the present invention) are formed in the inside of the channel unit 11. In FIG. 2, the nozzles 21 and the manifolds 30 inside the channel unit 11 are depicted by broken lines. Through holes and recessed parts constructing the plurality of individual channels 20 and the plurality of manifolds 30 are formed in each of the plates 11*a* to 11*i*.

As depicted in FIG. 2, the plurality of manifolds 30 each of which extends along the conveying direction are arranged in the scanning direction in the channel unit 11. The manifolds 30 communicate with the ink tank 7 via supply ports 30*a* provided on an end part on the downstream side in the conveying direction of the channel unit 11. The supply ports 30*a* are opened in an upper surface 11*x* of the channel unit 11.

Each of the plurality of manifolds 30 corresponds one of the black, yellow, cyan and magenta inks. In the following explanation, manifolds 30 corresponding to the black ink are referred to as a "manifold group 30*b*", manifolds 30 corresponding to the yellow ink are referred to as a "manifold group 30*y*", manifolds 30 corresponding to the cyan ink are referred to as a "manifold group 30*c*", and manifolds 30 corresponding to the magenta ink are referred to as a "manifold group 30*m*". Each of the manifold groups 30*b*, 30*y*, 30*c* and 30*m* is an example of a "common liquid chamber group" of the present invention. The manifold group 30*b* may be an example of a "first common liquid chamber group" of the present invention, and the manifold group 30*y* may be an example of a "second common liquid chamber group" of the present invention.

The manifold group 30*b* is constructed of four manifolds 30. Each of the manifold groups 30*y*, 30*c* and 30*m* is constructed of three manifolds 30. The manifold groups 30*b*, 30*y*, 30*c* and 30*m* are arranged in this order from the second side toward the first side of the scanning direction.

Figure 3:
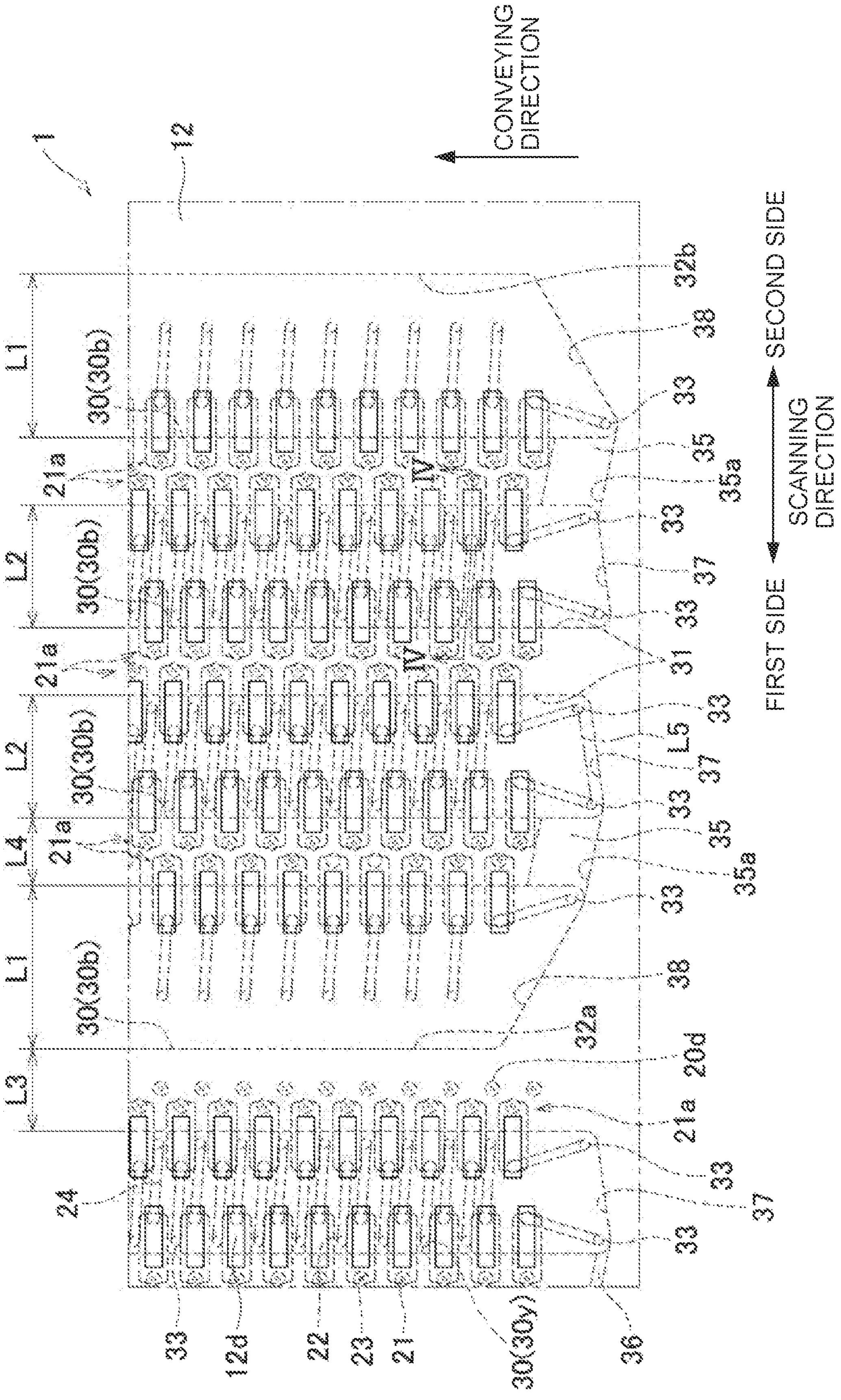
FIG. 3 is an expanded view of an area A surrounded by alternate long and short dash lines in the ink-jet head depicted in FIG. 2.

Here, among the four manifolds 30 constructing the manifold group 30*b*, two manifolds 30 each positioned at a location different from both ends in the scanning direction of the manifold group 30*b* (that is, each of the manifolds 30 interposed between other two manifolds) are each referred as an intermediate manifold 31 (an example of an "intermediate liquid chamber" of the present invention). As depicted in FIG. 3, among the four manifolds 30 constructing the manifold group 30*b*, a length L1 along the scanning direction of manifolds 30 positioned, respectively, at the both ends in the scanning direction of the manifold group 30*b* is longer as compared with a length L2 along the scanning direction of the intermediate manifold 31. In view of this, among the four manifolds 30 constructing the manifold group 30*b*, the two manifolds 30 positioned, respectively, at the both ends in the scanning direction of the manifold group 30*b* are referred as expanded manifolds 32*a*, 32*b* (each of which is an example of an "expanded common liquid chamber" of the present invention). Note that among the four manifolds 30 constructing the manifold group 30*b*, the expanded manifold 32*a* is positioned at an end on the first side in the scanning direction of the manifold group 30*b*, and the expanded manifold 32*b* is positioned at an end on the second side in the scanning direction of the manifold group 30*b*.

In the present embodiment, the length L1 along the scanning direction of each of the expanded manifolds 32*a*, 32*b* is 2 mm. Further, the length L2 along the scanning direction of each of the intermediate manifolds 31 is 1.5 mm. It is preferred that the length L1 is not less than 1.3 times the length L2. Note that a length along the conveying direction and a depth of each of the expanded manifolds 32*a*, 32*b* are substantially same as those of each of the intermediate manifolds 31. Accordingly, the volume of each of the expanded manifolds 32*a*, 32*b* is greater than the volume of each of the intermediate manifolds 31.

The length in the scanning direction, the length in the conveying direction and the depth of each of the manifolds 30 constructing the manifold group 30*y*, 30*c* and 30*m* are substantially same as those of each of the intermediate manifolds 31 of the manifold group 30*b*. Namely, the volume of each of nine pieces of the manifold 30 constructing the manifold group 30*y*, 30*c* and 30*m*, and the volume of each of the intermediate manifolds 31 of the manifold group 30*b* are substantially same as one another.

Here, as depicted in FIG. 3, a spacing distance in the scanning direction between the expanded manifold 32*a* of the manifold group 30*b* and a manifold 30, of three manifolds 30 included in the manifold group 30*y*, adjacent to the expanded manifold 32*a* in the scanning direction is referred to as a spacing distance L3. Further, a spacing distance in the scanning direction between the expanded manifold 32*a* of the manifold group 30*b* and an intermediate manifold 31, of the manifold group 30*b*, which is adjacent to the expanded manifold 32*a* in the scanning direction is referred to as a spacing distance L4. Here, the spacing distanced L3 is not more than 1.2 times the distance L4.

In the manifold group 30*b*, an end part on the upstream side in the conveying direction of the expanded manifold 32*a* located at the end on the first side in the scanning direction and an end part on the upstream side in the conveying direction of the intermediate manifold 31 adjacent to the expanded manifold 32*a* in the scanning direction are connected to each other by a communicating channel 35. Further, an end part on the upstream side in the conveying direction of the expanded manifold 32*b* located at the end on the second side in the scanning direction and an end part on the upstream side in the conveying direction of the intermediate manifold 31 adjacent to the expanded manifold 32*a* in the scanning direction are connected to each other by a communicating channel 35.

In each of the manifold groups 30*y*, 30*c* and 30*m*, the three manifolds 30 constructing each of the manifold groups 30*y*, 30*c* and 30*m* are connected to one another at end parts thereof on the upstream side in the conveying direction, with a communicating channel 36. The communicating channel 36 has a width (a length in a direction orthogonal to a direction of a flowing direction in which the ink flow in the top view) which is shorter than the width of the communicating channel 35.

Due to the difference in pressure between the inks inside the manifolds 30 connected to each other by the communicating channel 35 or 36, the ink flows to and flows in each of the communicating channels 35 and 36. Here, since the volume of each of the expanded manifolds 32*a*, 32*b* and the volume of each of the intermediate manifolds 31 are different, the frequency of the pressure wave generated in each of the expanded manifolds 32*a*, 32*b* and the frequency of the pressure wave generated in each of the intermediate manifolds 31 are different. Namely, the difference in pressure between each of the expanded manifold 32*a*, 32*b* and the frequency of the pressure wave generated in each of the intermediate manifolds 31 is relatively large. Accordingly, the ink easily flows to and flows in the communicating channel 35 connecting or linking each of the expanded manifolds 32*a*, 32*b* and the intermediate manifolds 31.

On the other hand, since the volumes of the manifolds 30 belonging to the manifold groups 30*y*, 30*c* and 30*m* are substantially same, the difference in pressure between the manifolds 30 connected by the communicating channel 36 is relatively small. In the present embodiment, by making the width of the communicating channel 36 to be smaller than the width of the communicating channel 35, the ink is allowed to flow to and flow in the communicating channel 36 even though the difference in pressure between the manifolds 30 connected by the communicating channel 36 is small.

As depicted in FIGS. 4 and 5, the manifold 30 is constructed of through holes formed in the plates 11*d*, 11*e* and 11*f*. Note that regarding the communicating channels 35 and 36, each of the communicating channels 35 and 36 is also formed of through holes formed in the plates 11*d*, 11*e* and 11*f*. A dumper chamber 40 is provided at a location below the manifold 30. The damper chamber 40 is constructed of a recessed part which is formed in the plate 11*g* and of which lower part is opened. The bottom part of the recessed part in the plate 11*g* functions as a damper film 41 of the manifold 30.

As depicted in FIG. 5, a release groove 39 which traps or catches an excess adhesive between the plates is formed in the lower surface of each of the plates 11*a* to 11*h*. Note that the release groove 39 may be formed in the upper surface of each of the plates 11*b* to 11*i*. By trapping the excess adhesive by the release groove 39, it is possible to prevent the excess adhesive from entering into the manifold 30 and/or the individual channel 20. The release groove 39 extending in the conveying direction is formed at a location on the second side in the scanning direction with respect to the expanded manifold 32*b* which is positioned at the end on the second side in the scanning direction in the manifold group 30*b*. The expanded manifold 32*b* extends, in the scanning direction, up to a location in the vicinity of the release groove 39. Specifically, a distance in the scanning direction between the expanded manifold 32*b* and the release groove 39 is approximately 0.15 mm.

Each of the plurality of individual channels 20 communicates with one of the plurality of manifolds 30. As depicted in FIG. 4, each of the plurality of individual channels 20 includes a nozzle 21, a pressure chamber 22, a connecting channel 23 and an inflow channel 24. As depicted in FIG. 3, regarding each of the nozzles 21, the certain nozzle 21 is located at a position at which the certain nozzle 21 does not overlap, in the up-down direction, with a manifold 30 which is included in the plurality of manifolds 30 and which corresponds to the certain nozzle 21 (namely, a manifold 30 to which the individual channel 20 including the certain nozzle 21 is connected).

As depicted in FIG. 3, regarding each of the two intermediate manifolds 31 included in the manifold group 30*b*, the nozzles 21 of the individual channels 20 communicating with the certain intermediate manifold 31 are positioned on the both sides (the first and second sides) in the scanning direction with respect to the certain intermediate manifold 31. The nozzles 21 of the individual channels 20 communicating with the expanded manifold 32*a*, among the two expanded manifolds 32*a* and 32*b* included in the manifold group 30*b*, which is positioned on the first side in the scanning direction are positioned on the second side in the scanning direction with respect to the expanded manifold 32*a*, and are not positioned on the first side in the second direction with respect to the expanded manifold 32*a*. Further, the nozzles 21 of the individual channels 20 communicating with the expanded manifold 32*b*, among the two expanded manifolds 32*a* and 32*b* included in the manifold group 30*b*, which is positioned on the second side in the scanning direction are positioned on the first side in the scanning direction with respect to the expanded manifold 32*b*, and are not positioned on the second side in the second direction with respect to the expanded manifold 32*b*.

In an area between the expanded manifold 32*a* and the intermediate manifold 31 adjacent to each other in the scanning direction, there is arranged two nozzle rows 21*a*. One of the two nozzle rows 21*a* is constructed of the nozzles 21 each communicating with the intermediate manifold 31 adjacent to the expanded manifold 32*a* and aligned in the conveying direction. The other of the two nozzle rows 21*a* is constructed of the nozzles 21 each communicating with the expanded manifold 32*a* and aligned in the conveying direction. Similarly, two nozzle rows 21*a* are arranged in an area between the expanded manifold 32*b* and the intermediate manifold 31 adjacent to each other in the scanning direction. Further, in an area between two intermediate manifolds 31 adjacent to each other in the scanning direction, there is arranged two nozzle rows 21*a*. One of the two nozzle rows 21*a* is constructed of the nozzles 21 each communicating with one of the two intermediate manifolds 31 and aligned in the conveying direction. The other of the two nozzle rows 21*a* is constructed of the nozzles 21 each communicating with the other of the two intermediate manifolds 31 and aligned in the conveying direction.

Regarding each of the manifolds 30 in each of the manifold groups 30*y*, 30*c* and 30*m*, the nozzles 21 of the individual channels 20 communicating with each of the manifolds 30 are positioned on the both sides (the first and second sides) in the scanning direction with respect to each of the manifolds 30. Regarding the nine pieces of the manifold 30 which are different from the four manifolds 30 constructing the manifold group 30*b*, there is arranged two nozzle rows 21 in an area between two manifolds 30 adjacent to each other in the scanning direction. One of the two nozzle rows 21*a* is constructed of the nozzles 21 each communicating with one of the two manifolds 30 and aligned in the conveying direction. The other of the two nozzle rows 21*a* is constructed of the nozzles 21 each communicating with the other of the two manifolds 30 and aligned in the conveying direction.

In an area between the expanded manifold 32*a* included in the manifold group 30*b* and the manifold 30 which is one of the three manifolds 30 included in the manifold group 30*y* and which is adjacent to the expanded manifold 32*a* in the scanning direction, there is arranged a nozzle row 21*a* and a plurality of dummy individual channels 20*d* aligned in the conveying direction. The nozzle rows 21*a* is constructed of the nozzles 21 each communicating with the manifold 30 adjacent to the expanded manifold 32*a* and aligned in the conveying direction.

Each of the dummy individual channels 20*d* is a channel having a shape similar to that of the individual channel 20. Each of the dummy individual channels 20*d* of the present embodiment is constructed of a channel having a shape similar to that of the connecting channel 23 of the individual channel 20. Each of the dummy individual channels 20*d* may include a channel corresponding to each of the nozzle 21, the pressure chamber 22 and the inflow channel 24, in addition to a channel corresponding to the connecting channel 23. Each of the dummy individual channels 20*d* does not communicate with any of the manifolds 30.

As depicted in FIG. 2, on the first side of the manifold 30 which is one of the three manifolds 30 constructing the manifold group 30*m* positioned on the first side of any other manifold groups in the scanning direction, and which is outermost on the first side of the three manifolds 30, there is arranged a nozzle row 21*a* and a plurality of dummy individual channels 20*d* aligned in the conveying direction. The nozzle rows 21*a* is constructed of the nozzles 21 each communicating with the manifold 30 being outermost on the first side of the three manifolds 30 and aligned in the conveying direction.

As depicted in FIG. 4, each of the nozzles 21 is formed of a through hole formed in the plate 11*i*, and is opened in the nozzle surface 11*y* which is the lower surface of the channel unit 11.

The pressure chamber 22 is formed of a through hole formed in the plate 11*a*, and is opened in the upper surface 11*x* of the channel unit 11. The pressure chamber 22 extends in the scanning direction. As depicted in FIG. 3, pressure chambers 22, of the individual channels 20 which include the nozzles 21 positioned on the first side in the scanning direction of the manifold 30 so as to communicate with the manifold 30, are located at positions at which end parts on the second side in the scanning direction, of the pressure chambers 22, overlap with the manifold 30 in the top view, and end parts on the first side in the scanning direction, of the pressure chambers 22, do not overlap with the manifold 30 in the top view. Pressure chambers 22, of the individual channels 20 which include the nozzles 21 positioned on the second side in the scanning direction of the manifold 30 so as to communicating with the manifold 30, are located at positions at which end parts on the first side in the scanning direction, of the pressure chambers 22, overlap with the manifold 30 in the top view, and end parts on the second side in the scanning direction, of the pressure chambers 22, do not overlap with the manifold 30 in the top view.

The connecting channel 23 is connected to the end part, of the pressure chamber 22, on the side in the scanning direction not overlapping with the manifold 30 in the top view. Further, the inflow channel 24 is connected to the end part, of the pressure chamber 22, on the side in the scanning direction overlapping with the manifold 30 in the top view.

The connecting channel 23 connects each of the nozzles 21 with one of the pressure chambers 22. As depicted in FIG. 4, the connecting channel 23 is constructed of through holes each of which is formed in one of seven plates which are the plates 11*b* to 11*h*.

The inflow channel 24 connects the manifold 30 with each of the pressure chambers 22. The inflow channel 24 has a cross-sectional area in a plane orthogonal to the flowing direction of the ink smaller than that of the pressure chamber 22, and functions as a throttle. The inflow channel 24 is constructed of a through hole formed in the plate 11*b*, a recessed part formed in the plate 11*c* and opened upward, and a through hole positioned at one end in the scanning direction of the recessed part formed in the plate 11*c*. The inflow channel 24 is connected to the pressure chamber 22 by the through hole formed in the plate 11*b*. Further, the inflow channel 24 is connected to the manifold 30 by the through hole formed in the plate 11*c*. An opening of a lower end of the through hole formed in the plate 11*c* is a communicating port 33 via which the individual channel 20 is connected with respect to the manifold 30.

As depicted in FIG. 3, the inflow channel 24 connected to the pressure chamber 22, which is different from the pressure chamber 22 positioned on the upstream-most side in the conveying direction, extends in a direction away from the pressure chamber 22 with respect to the scanning direction from the end part in the scanning direction, of the pressure chamber 22, overlapping with the manifold 30 in the top view. This inflow channel 24 extends in an oblique direction oblique to some extent with respect to the scanning direction, and an end part, of the inflow channel 24, on the first side in the scanning direction is located on the downstream side in the conveying direction with respect to an end part of the inflow channel 24 on the second side in the scanning direction.

The inflow channel 24, connected to the pressure chamber 22 positioned on the upstream-most side in the conveying direction, extends toward the upstream side in the conveying direction, from the end part in the scanning direction, of the pressure chamber 22, overlapping with the manifold 30 in the top view. In this inflow channel 24, an end part, of the inflow channel 24, at which the inflow channel 24 is connected to the manifold 30 (namely, the communicating port 33) is located on the upstream side in the conveying direction with respect to an end part, of the inflow channel 24, which is connected to the pressure chamber 22, and on a side, in the scanning direction, closer to the nozzle 21 to which the inflow channel 24 is connected compared to the end part connected to the pressure chamber 22.

As depicted in FIG. 3, with respect to each of the manifolds 30 which are different from the expanded manifolds 32*a* and 32*b*, the communicating ports 33 of two individual channels 20 including two nozzles 21 positioned on the upstream-most side in the conveying direction of two nozzle rows 21*a* corresponding to the manifolds 30, are positioned in the vicinity of a side wall surface 37 defining an end part on the upstream side in the conveying direction of the manifolds 30. A virtual straight line L5 connecting the two communicating ports 33 is inclined with respect to the scanning direction. The side wall surface 37 of the manifolds 30 is parallel to the virtual straight line L5.

A side wall surface 38 defining an end part on the upstream side in the conveying direction of each of the expanded manifolds 32*a*, 32*b* is connected to a communicating channel surface 35*a* defining a communicating channel 35 connecting or linking, in the scanning direction, each of the expanded manifolds 32*a*, 32*b* and the intermediate manifold 31 adjacent to each of the expanded manifolds 32*a*, 32*b*. Namely, an opening, of the communicating channel 35, with respect to each of the expanded manifolds 32*a* and 32*b*, is formed such that an outer edge of the opening makes contact with the side wall surface 38 of each of the expanded manifolds 32*a*, 32*b*. Alternatively, the side wall surface 38 and the communicating channel surface 35*a* may be formed as a continuous surface with no step. The communicating port 33, of the individual channel 20 including a nozzle 21 positioned on the upstream-most side in the conveying direction in the nozzle row 21*a* corresponding to the expanded manifold 32*a* or 32*b*, is positioned in the vicinity of a connecting part, in the side wall surface 38, with respect to the communicating channel surface 35*a*. The side wall surface 38 is inclined with respect to the scanning direction so that the connecting part with respect to the communicating channel surface 35*a* is positioned on the upstream-most side in the conveying direction. Namely, the side wall surface 38 is inclined so that the side wall surface 38*a* is shifted toward the upstream side in the conveying direction, as approaching closer toward the communicating channel surface 35*a* in the scanning direction.

The ink inside the ink tank 7 is fed from the supply port 30*a* to the manifold 30 due to the head difference. The ink fed into the manifold 30 is supplied to each of the individual channels 20 via the communicating port 33, while moving inside the manifold 30 from the downstream side toward the upstream side in the conveying direction. The ink supplied to each of the individual channels 20 passes through the inflow channel 24 and flows into the pressure chamber 22, moves inside the pressure chamber 22 substantially horizontally, and flows into the connecting channel 23. The ink inflowed into the connecting channel 23 moves downward and is discharged from the nozzle 21.

<Piezoelectric Actuator 12>

As depicted in FIG. 4, the piezoelectric actuator 12 includes a vibration plate 12*a*, a common electrode 12*b*, a piezoelectric layer 12*c* and a plurality of individual electrodes 12*d*, from the lower side in this order.

The vibration plate 12*a* is arranged on the upper surface 11*x* of the channel unit 11. The common electrode 12*b*, the piezoelectric layer 12*c* and the plurality of individual electrodes 12*d* which are stacked in order from the lower side are arranged in an area, in the upper surface of the vibration plate 12*a*, which faces the plurality of pressure chambers 22. The vibration plate 12*a*, the common electrode 12*b* and the piezoelectric layer 12*c* are arranged to span across the plurality of pressure chambers 22. Each of the plurality of individual electrodes 12*d* is provided on one of the plurality of pressure chambers 22, and overlaps with one of the plurality of pressure chamber 22 in the top view.

The common electrode 12*b* and the plurality of individual electrodes 12*d* are connected to a non-illustrated driver IC via a non-illustrated wiring member. The driver IC maintains the potential of the common electrode 12*b* at the ground potential, whereas the driver IC changes the potential of the plurality of individual electrodes 12*d*. With this, a part of the vibration plate 12*a* and a part of the piezoelectric layer 12*c* which are interposed between each of the plurality of individual electrodes 12*d* and the one of the plurality of pressure chambers 22 (an actuator 12*x*) is deformed so as to project toward the pressure chamber 22. Due to this deformation, the volume of the pressure chamber 22 becomes small, which in turn increase the pressure of the ink inside the pressure chamber 22, thereby causing the ink to be discharged from a nozzle 21 included in the plurality of nozzles 21 and corresponding to the pressure chamber 22.

Namely, the piezoelectric actuator 12 has a plurality of actuators 12*x* each of which corresponds to one of the plurality of pressure chambers 22.

<Characteristic of Embodiment>

As described above, the ink-jet head 1 according to the embodiment is provided with the plurality of manifolds 30 each of which extends along the conveying direction and which are arranged in the scanning direction; and the plurality of individual channels 20 each communicating with one of the plurality of manifolds 30 and having the plurality of nozzles 21 each of which is located at the position, in the up-down direction, not overlapping with one of the plurality of manifolds 30 corresponding thereto. The plurality of manifolds 30 include the intermediate manifolds 31 each positioned at the location different from the both ends in the scanning direction of the plurality of manifolds 30; and the expanded manifolds 32*a* and 32*b* positioned, respectively, at the both ends in the scanning direction of the plurality of manifolds 30, and each having the length along the scanning direction which is longer than that of the intermediate manifolds 31. The individual channels 20 communicating with each of the intermediate manifolds 31 have the nozzles 21 which are positioned at the both ends in the scanning direction with respect to each of the intermediate manifolds 31. The nozzles 21 of the individual channels 20 communicating with the expanded manifold 32*a* positioned at the end on the first side in the scanning direction are positioned on the second side in the scanning direction with respect to the expanded manifold 32*a*, and are not positioned on the first side in the second direction with respect to the expanded manifold 32*a*. Further, the nozzles 21 of the individual channels 20 communicating with the expanded manifold 32*b* positioned at the end on the second side in the scanning direction are positioned on the first side in the scanning direction with respect to the expanded manifold 32*b*, and are not positioned on the second side in the second direction with respect to the expanded manifold 32*b*.

According to the above-described configuration, regarding the expanded manifold 32*a* positioned at the end on the first side in the scanning direction, the nozzles 21 are arranged on the second side in the scanning direction of the expanded manifold 32*a*, and are not positioned on the first side in the second direction of the expanded manifold 32*a*. Further, regarding the expanded manifold 32*b* positioned at the end on the second side in the scanning direction, the nozzles 21 are arranged on the first side in the scanning direction of the expanded manifold 32*b*, and are not positioned on the second side in the second direction of the expanded manifold 32*b*. Namely, the nozzle rows 21*a* are not present on the both sides in the scanning direction of each of the expanded manifolds 32*a* and 32*b*; rather, the nozzle row 21*a* is present only on one side (the first side or the second side) in the scanning direction of each of the expanded manifolds 32*a* and 32*b*. Accordingly, even in a case that the length along the scanning direction of each of the expanded manifolds 32*a* and 32*b* is great, there is no such a situation that the spacing distance between the nozzle rows 21*a* each communicating with the expanded manifold 32*a* or 32*b* becomes to be great. Accordingly, it is possible to suppress any increase in the degree of difficulty in the adjustment of the inclination of the ink-jet head 1, while making the volume of the manifold 30 to be great. Further, it is possible to suppress any increase in the size of the maintenance member such as the cap 6, etc., and to suppress any increase in the size of the printer 100 provided with the ink-jet head 1.

Furthermore, in the ink-jet head 1 according to the above-described embodiment, the length L1 along the scanning direction of each of the expanded manifolds 32*a* and 32*b* is not less than 1.3 times the length L2 along the scanning direction of each of the intermediate manifolds 31. Accordingly, it is possible to make the volume of each of the expanded manifolds 32*a*, 32*b* be sufficiently great.

Moreover, the ink-jet head 1 according to the above-described embodiment is provided with the communicating channels 35 and 36 each of which connects or links the end parts on the upstream side in the conveying direction of the different manifolds 30. Accordingly, the pressure waves generated in the respective manifolds 30 interfere with each other and cancel each other out via the communicating channels 35 and 36. With this, it is possible to suppress such a situation that the discharge of the ink(s) is affected by the pressure waves.

In addition, in the ink-jet head 1 of the above-described embodiment, the communicating channel 35 connects one of the expanded manifolds 32*a* and 32*b* and the intermediate manifold 31. In a case that the flow of the ink between manifolds 30 connected by the communicating channel 35 is not smooth, any stagnation is generated, which in turn leads to any viscous ink (viscosity increased ink) remaining therein. According to the configuration of the present embodiment, since the volume of each of the expanded manifolds 32*a* and 32*b* and the volume of the intermediate manifold 31 are different, the difference in pressure is relatively large between each of the expanded manifolds 32*a*, 32*b* and the intermediate manifold 31, and thus the flow of the ink therebetween via the communicating channel 35 is smooth.

Further, in the ink-jet head 1 of the above-described embodiment, the side wall surface 38 defining the end part on the upstream side in the conveying direction of each of the expanded manifolds 32*a*, 32*b* is connected to the communicating channel surface 35*a* defining the communicating channel 35, and the side wall surface 38 is inclined with respect to the scanning direction so that the connecting part with respect to the communicating channel surface 35*a* is positioned on the upstream-most side in the conveying direction. Accordingly, the end part of each of the expanded manifolds 32*a* and 32*b* is connected smoothly to the communicating channel 35, the flow of the ink is smooth. Since the length L1 along the scanning direction of each of the expanded manifolds 32*a* and 32*b* is relatively long, it is possible to make the inclination of the side wall surface 38 to be gradual.

Furthermore, in the ink-jet head 1 of the above-described embodiment, the spacing distance L3 in the scanning direction between the expanded manifold 32*a* of the manifold group 30*b* and the manifold 30 which is adjacent to the expanded manifold 32*a* among the three manifolds 30 included in the manifold group 30*y* is not more than 1.2 times the spacing distance L4 in the scanning direction between the expanded manifold 32*a* of the manifold group 30*b* and the intermediate manifold 31 which is adjacent to the expanded manifold 32*a* among the two pieces of intermediate manifold 31 in the manifold group 30*b*. Accordingly, it is possible to secure the volume of the expanded manifold 32*a* of the manifold group 30*b* to be great, without any interference with the manifold group 30*y*.

In addition, in the ink-jet head 1 of the above-described embodiment, in the area between the expanded manifold 32*a* and the intermediate manifold 31, there is arranged the nozzle row 21*a* constructed of the nozzles 21 each communicating with the intermediate manifold 31 and aligned in the conveying direction and the nozzle row 21*a* constructed of the nozzles 21 each communicating with the expanded manifold 32*a* and aligned in the conveying direction. Further, in the area between the expanded manifold 32*a* and the manifold 30, of the three manifolds 30 of the manifold group 30*y*, adjacent to the expanded manifold 32*a* in the scanning direction, there is arranged the nozzle row 21*a* constructed of the nozzles 21 each communicating with the manifold 30 and aligned in the conveying direction and the dummy individual channels 20*d* aligned in the conveying direction. By providing the plurality of dummy individual channels 20*d* each having the shape similar to that of the individual channel 20, it is possible to make any fluctuation or variation in the shape of the individual channels 20 and/or in the flow of the adhesive between the plates to be small, thereby making it possible to make the characteristic of the individual channels 20 to be constant or uniform.

Moreover, the ink-jet head 1 of the above-described embodiment is provided with the release grooves 39 which trap or catch any excess adhesive between the plates, and the expanded manifold 32*b* extends, in the scanning direction, up to the location in the vicinity of each of the release grooves 39. Accordingly, it is possible to secure the volume of the expanded manifold 32*b* to be great, without any interference with the release grooves 39.

Although the embodiment of the present disclosure has been explained in the foregoing, the specific configuration of the present disclosure should be considered as not being limited to or restricted by these embodiments. The scope of the present invention is indicated by the scope of the claims, rather than by the explanation of the embodiment as described above; further, the scope of the present invention encompasses any variation equivalent in meaning to the scope of the claims and within the scope of the claims.

In the above-described embodiment, although the explanation has been made about the case wherein the two manifolds 30 which are positioned, respectively, on the both ends in the scanning direction among the four manifolds 30 constructing the manifold group 30*b* are the expanded manifolds 32*a* and 32*b* of which length in the scanning direction is longer than that of the intermediate manifolds 31, the present disclosure is not limited to this. Namely, it is allowable that only one of the two manifolds 30 positioned, respectively, on the both ends in the scanning direction among the four manifolds 30 constructing the manifold group 30*b* is an expanded manifold of which length in the scanning direction is longer than that of the intermediate manifolds 31.

Further, in the above-described embodiment, although the explanation has been made about the case wherein the expanded manifolds 32*a* and 32*b* are included only in the manifold group 30*b*, the present disclosure is not limited to this. Namely, it is allowable that at least one expanded manifold is included in at least one of the manifold groups 30*b*, 30*y*, 30*m* and 30*c*.

Furthermore, in the above-described embodiment, although the explanation has been made about the case wherein the length L1 along the scanning direction of each of the expanded manifolds 32*a* and 32*b* is not less than 1.3 times the length L2 along the scanning direction of each of the intermediate manifolds 31, the present disclosure is not limited to this. The length L1 can be any length longer than the length L2.

Moreover, in the above-described embodiment, although the explanation has been made about the case wherein the plurality of dummy individual channels 20*d* are arranged between the expanded manifold 32*a* and the certain manifold 30 which is adjacent in the scanning direction to the expanded manifold 32*a* among the three manifolds 30 included in the manifold group 30*y*, the present disclosure is not limited to this. It is allowable that the plurality of dummy individual channels 20*d* are not provided.

In addition, in the above-described embodiment, although the explanation has been made about the case provided with the communicating channels 35 and 36 each of which connects the end parts on the upstream side in the conveying direction of the different manifolds 30, the present disclosure is not limited to this. It is allowable that the communicating channel 35 and/or 36 are/is not provided. Further, in the above-described embodiment, although end parts on the upstream side in the conveying direction of the intermediate manifolds 31 in the manifold group 30*b* are not connected, it is allowable that the end parts on the upstream side in the conveying direction of the intermediate manifolds 31 are also connected to each other via a communicating channel.

Further, in the above-described embodiment, although the explanation has been made about the case wherein the side wall surface 38 defining the end part on the upstream side in the conveying direction of each of the expanded manifolds 32*a* and 32*b* is inclined with respect to the scanning direction so that the connecting part with respect to the communicating channel surface 35*a* is positioned on the upstream-most side in the conveying direction, the present disclosure is not limited to this. Namely, for example, it is allowable that the side wall surface 38 is inclined with respect to the scanning direction so that the connecting part with the communicating channel surface 35*a* is positioned on the downstream side in the conveying direction of other part of the side wall surface 38, or may be parallel to the scanning direction.

In addition, in the above-described embodiment, although the explanation has been made about the case wherein the release grooves 39 are provided on the second side in the scanning direction with respect to the expanded manifold 32*b*, and the expanded manifold 32*b* expands, with respect to the scanning direction, up to the location in the vicinity of the release grooves 39, the present disclosure is not limited to this. Namely, it is allowable that the release grooves 39 are not provided on the second side in the scanning direction with respect to the expanded manifold 32*b*.

Moreover, in the above-described embodiment, although the explanation has been made about the case wherein the spacing distance L3 in the scanning direction between the expanded manifold 32*a* of the manifold group 30*b* and the certain manifold 30 which is adjacent to the expanded manifold 32*a* among the three manifolds 30 included in the manifold group 30*y* is not more than 1.2 times the spacing distance L4 in the scanning direction between the expanded manifold 32*a* of the manifold group 30*b* and the intermediate manifold 31 which is adjacent to the expanded manifold 32*a* among the two pieces of intermediate manifold 31 in the manifold group 30*b*, the present disclosure is not limited to this. It is allowable that the spacing distance L3 is greater than 1.2 times the spacing distance L4.

The actuator 12*x* is not limited to that of the piezoelectric system using the piezoelectric element; it is allowable that the actuator 12 is of another system (for example, a thermal system using a heating element, an electrostatic system using the electrostatic force, etc.).

The recording system of the printer 100 is not limited to the serial system; the recording system may be the line system in which a head is long in the width direction of the recording sheet P and the position of the head is fixed, and the head discharges an ink from nozzles of the head.

The liquid discharged from the nozzles 21 is not limited to the ink, and may be any liquid (e.g., a treatment liquid that agglutinates or precipitates a component of an ink). Further, an object of discharge is not limited to the recording sheet P, and may be, for example, cloth (fabric), a substrate, etc.

The present disclosure is applicable also to facsimiles, copy machines, multifunction peripherals, etc. without being limited to the printer. Further, the present disclosure is also applicable to a liquid discharge apparatus used for any other application than the image recording (for example, a liquid discharge apparatus which forms an electroconductive pattern by discharging an electroconductive liquid on a substrate).

What is claimed is:

1. A liquid discharging head comprising:

a plurality of common liquid chambers each of which extends along a first direction and which is arranged in a second direction orthogonal to the first direction; and a plurality of individual channels each communicates with one of the plurality of common liquid chambers and each has a nozzle located at a position where the nozzle does not overlap with corresponding one of the plurality of common liquid chambers in a third direction, the third direction being orthogonal to both of the first direction and the second direction;

wherein the liquid discharging head has a first end in the second direction and a second end in the second direction opposite to the first end;

the plurality of common liquid chambers includes an intermediate common liquid chamber and an expanded common liquid chamber, the intermediate common liquid chamber being one of the plurality of common liquid chambers interposed between two of the plurality of common liquid chambers in the second direction, the expanded common liquid chamber being one of the plurality of common liquid chambers closest to the first end among the plurality of common liquid chambers, a length of the expanded common liquid chamber in the second direction being longer than a length of the intermediate common liquid chamber in the second direction;

the nozzles of the plurality of individual channels communicating with the intermediate common liquid chamber are positioned on both sides in the second direction with respect to the intermediate common chamber; and the nozzles of the plurality of individual channels communicating with the expanded common liquid chamber are positioned in the second direction on a side of the second end with respect to the expanded common liquid chamber, and no nozzle of the plurality of individual channels communicating with the expanded common liquid chamber is positioned in the second direction on a side of the first end with respect to the expanded common liquid chamber.

2. The liquid discharging head according to claim 1, wherein the length of the expanded common liquid chamber in the second direction is not less than 1.3 times the length of the intermediate common liquid chamber in the second direction.

3. The liquid discharging head according to claim 1, further comprising a communicating channel connecting end parts on one side in the first direction of the plurality of common liquid chambers.

4. The liquid discharging head according to claim 3, wherein the communicating channel connects the expanded common liquid chamber and the intermediate common liquid chamber.

5. The liquid discharging head according to claim 4, wherein a side wall surface defining an end on the one side in the first direction of the expanded common liquid chamber is connected to a communicating channel surface defining the communicating channel, and the side wall surface is inclined so that a connection part between the side wall and the communicating channel surface is positioned on the one side in the first direction of any other parts of the side wall surface.

6. The liquid discharging head according to claim 1 comprising a first common liquid chamber group constructed of the plurality of common liquid chambers including the expanded common liquid chamber, and at least one additional common liquid chamber group constructed of a plurality of common liquid chambers each of which extends along the first direction and which is arranged in the second direction, the plurality of common liquid chambers of the first common liquid chamber group corresponds to a liquid of a same kind, and the plurality of common liquid chambers of each of the at least one additional common liquid chamber group corresponds to a liquid of a same kind, and the first common liquid chamber group and the at least one additional liquid chamber group are arranged in the second direction.

7. The liquid discharging head according to claim 6, wherein the at least one additional liquid chamber group includes a second common liquid chamber group which is positioned on the side of the first end in the second direction with respect to the first common liquid chamber group; and a spacing distance in the second direction between the expanded common liquid chamber and a first adjacent common liquid chamber, of the plurality of common liquid chambers included in the second common liquid chamber group, adjacent to the expanded common liquid chamber in the second direction is not more than 1.2 times a spacing distance in the second direction between the expanded common liquid chamber and a second adjacent common liquid chamber, of the plurality of common liquid chambers included in the first common liquid chamber group, adjacent to the expanded common liquid chamber in the second direction.

8. The liquid discharging head according to claim 6, wherein the at least one additional liquid chamber group includes a second common liquid chamber group which is positioned on the side of the first end in the second direction with respect to the first common liquid chamber group;

in an area between the expanded common liquid chamber and a first adjacent common liquid chamber, of the plurality of common liquid chambers included in the first common liquid chamber group, adjacent to the expanded common liquid chamber in the second direction, a nozzle row constructed of the nozzles each communicating with the first adjacent common liquid chamber and arranged in the first direction and a nozzle row constructed of the nozzles each communicating with the expanded common liquid chamber and arranged in the first direction are arranged; and in an area between the expanded common liquid chamber and a second adjacent common liquid chamber, of the plurality of common liquid chambers included in the second common liquid chamber group, adjacent to the expanded common liquid chamber in the second direction, a nozzle row constructed of the nozzles each communicating with the second adjacent common liquid chamber and arranged in the first direction and a plurality of dummy individual channels arranged in the first direction are arranged.

9. The liquid discharging head according to claim 1, wherein the liquid discharging head is constructed of a plurality of plates stacked in the third direction and adhered to each other with an adhesive;

at least one of the plurality of plates has a releasing groove configured to catch an excessive adhesive between the plurality of plates; and the expanded common liquid chamber extends up to a location in the vicinity of the release groove with respect to the second direction.

10. A printing apparatus comprising;

the liquid discharging head as defined in claim 1, and a conveyer configured to convey a printing medium to which a liquid is to be discharged from the liquid discharging head.

* * * * *